(12) United States Patent
Geyer

(10) Patent No.: US 8,836,264 B2
(45) Date of Patent: Sep. 16, 2014

(54) CONTROLLER FOR A ROTATING ELECTRICAL MACHINE

(75) Inventor: Tobias Geyer, Parnell (NZ)

(73) Assignee: ABB Research Ltd., Zurich (CH)

( * ) Notice: Subject to any disclaimer, the term of this patent is extended or adjusted under 35 U.S.C. 154(b) by 812 days.

(21) Appl. No.: 13/010,809

(22) Filed: Jan. 21, 2011

(65) Prior Publication Data

US 2011/0181225 A1 Jul. 28, 2011

(30) Foreign Application Priority Data

Jan. 22, 2010 (EP) .................................... 10151370

(51) Int. Cl.
*H02P 1/52* (2006.01)
*H02M 7/487* (2007.01)
*H02P 23/00* (2006.01)
*H02P 27/14* (2006.01)
*H02P 27/12* (2006.01)

(52) U.S. Cl.
CPC .............. *H02P 27/12* (2013.01); *H02M 7/487* (2013.01); *H02P 23/004* (2013.01); *H02P 27/14* (2013.01)
USPC ......................................... 318/503; 318/494

(58) Field of Classification Search
USPC ................................................ 318/503, 494
See application file for complete search history.

(56) References Cited

U.S. PATENT DOCUMENTS

| | | | | |
|---|---|---|---|---|
| 4,763,060 A | * | 8/1988 | Takahashi | 318/811 |
| 5,481,448 A | * | 1/1996 | Nakata et al. | 363/137 |
| 5,907,228 A | * | 5/1999 | Thomas et al. | 318/568.1 |
| 6,031,738 A | * | 2/2000 | Lipo et al. | 363/37 |
| 6,058,031 A | * | 5/2000 | Lyons et al. | 363/67 |
| 6,459,596 B1 | * | 10/2002 | Corzine | 363/37 |
| 6,842,354 B1 | * | 1/2005 | Tallam et al. | 363/98 |
| 7,256,561 B2 | | 8/2007 | Geyer et al. | |
| 2005/0209045 A1 | * | 9/2005 | Lewis | 477/107 |
| 2009/0066276 A1 | * | 3/2009 | Kley et al. | 318/400.15 |
| 2010/0253269 A1 | * | 10/2010 | Papafotiou et al. | 318/400.26 |
| 2012/0161685 A1 | * | 6/2012 | Geyer et al. | 318/503 |

FOREIGN PATENT DOCUMENTS

EP 1670135 B1 6/2006

OTHER PUBLICATIONS

European Search Report dated Aug. 5, 2010, for European Application No. 10151370.3.
Tobias Geyer et al., Model Predictive Direct Torque Control of a Variable Speed Drive with a Five-Level Inverter, Industrial Electronics, 2009, Piscataway, NJ, USA pp. 1203-1208.
Tobias Geyer, Generalized Model Predictive Direct Torque Control: Long Prediction Horizons and Minimization of Switching Losses, Joint 48th IEEE Conference on Decision and Control and 28th Chinese Control Conference, Dec. 2009, pp. 6799-6804.
Tobias Geyer et al., Model Predictive Direct Torque Control—Part I: Concept, Algorithm, and Analysis, IEEE Transactions on Industrial Electronics, vol. 56, No. 6, Jun. 2009, pp. 1894-1905.

* cited by examiner

*Primary Examiner* — Kawing Chan
(74) *Attorney, Agent, or Firm* — Buchanan Ingersoll & Rooney PC

(57) ABSTRACT

To minimize switching losses in a rotating electrical machine, exemplary embodiments of the present disclosure proposes an iterative control method which calculates optimal switching states in advance. A rotating electrical machine can be controlled on the basis of this iterative control method.

28 Claims, 7 Drawing Sheets

US 8,836,264 B2

CONTROLLER FOR A ROTATING ELECTRICAL MACHINE

RELATED APPLICATIONS

This application claims priority under 35 U.S.C. §119 to European Patent Application No. 10151370.3 filed in Europe on Jan. 22, 2010, the entire content of which is hereby incorporated by reference in its entirety.

FIELD

This present disclosure relates to the field of operating methods for rotating electrical machines. More particularly, the present disclosure relates to a method for operating a rotating electrical machine, a controller for an electrical converter, a motor system, and a computer-implemented product for operating a rotating electrical machine.

BACKGROUND INFORMATION

Direct torque control (DTC) is a method for controlling the torque and the electromagnetic flux in rotating electromagnetic machines and motors, for example, in the medium-voltage range. A typical example of such a controller can be found, for example, in the drive of the ACS 6000 by ABB. Over the last 10 years, DTC has demonstrated a high degree of reliability, robustness and performance.

However, the switching losses, which are produced due to semiconductors being switched by the controller and which represent a large proportion or even the majority of the total losses of the drive, can be considerable in the case of DTC. Therefore, ways of reducing these switching losses are sought. It is known that such a reduction in switching losses can be achieved by so-called model predictive direct torque control (MPDTC), which can be based on a (mathematical) model of the drive. U.S. Pat. No. 7,256,561 and EP 1 670 135 describe such a method.

In addition to the minimization of the converter switching losses, DTC and MPDTC can also be geared towards keeping the three output variables of the rotating electrical machine, namely the electromagnetic torque, the variable of the stator flux and the neutral point potential(s) or mid-point potential(s), within predetermined (hysteresis) limits.

MPDTC is based on a control algorithm which can include a mathematical model that is matched to the converter to be switched and to the machine or motor connected thereto. In this case, the permissible switching sequences of the converter over a specific switching horizon (e.g., period) are listed and the corresponding torque, stator flux and intermediate-circuit mid-point potential trajectories are calculated using an internal model of the converter and the machine. There are also converters with more than one neutral point. There are also converters which have other variables that need to be regulated, under certain circumstances. In this case, these trajectories are extrapolated until a limit for the respective output variables is reached. The permissible switching sequences are evaluated using a predetermined quality criterion. This quality criterion maps, for example, the switching losses or the switching frequency of the converter. In a last step, an optimal switching sequence is determined which minimizes this quality criterion, e.g., a quality criterion which provides minimum switching losses or a minimum switching frequency, for example. The aforementioned steps aforementioned are generally implemented in any control cycle and, of the optimal switching sequence, only the first step (e.g., the first switching transition or switching state) is used for controlling the power semiconductors of the converter.

SUMMARY

An exemplary embodiment provides a method for operating a rotating electrical machine. The rotating electrical machine is supplied with electric current by a converter from a DC voltage circuit via at least one phase, and the converter is configured to switch the at least one phase to at least two voltage levels. The exemplary method includes generating switching sequences, wherein each switching sequence includes a series of switching transitions of the converter with a first switching transition. The exemplary method also includes evaluating each of the switching sequences with a quality value, and selecting the switching sequence with a minimum quality value. In addition, the exemplary method includes driving switching elements of the converter with the first switching transition of the selected switching sequence as the selected switching transition, so that at least one phase is switched to a voltage level which corresponds to the switching transition. The switching sequences are generated as follows: (a) a switching sequence of a first length is generated from a switching sequence of a second length smaller than the first length, wherein at least one possible switching transition is attached to the switching sequence of the second length, and a first switching sequence with a preselected switching transition is initialized; (b) output variables of the electrical machine are calculated for the switching sequence of the first length on the basis of the switching transitions of the switching sequence of the first length; (c) the switching sequence of the firs length is rejected if calculated output variables are not within predefined limits and/or calculated output variables become removed from a predefined limit as the time increases; and further switching sequences are generated iteratively from the unrejected switching sequence in accordance with steps (a) to (c).

Exemplary embodiments of the present disclosure also provide a controller and a non-transitory computer-readable recording medium having a computer program recorded thereon that causes a processor of a computing device to implement various features of the above-described method.

BRIEF DESCRIPTION OF THE DRAWINGS

Additional refinements, advantages and features of the present disclosure are described in more detail below with reference to exemplary embodiments illustrated in the drawings, in which.

The reference symbols used in the drawings and the significance thereof are given, in summarized form, in the list of reference symbols. In principle, identical or similar parts have been provided with the same reference symbols.

DETAILED DESCRIPTION

Figure 1:
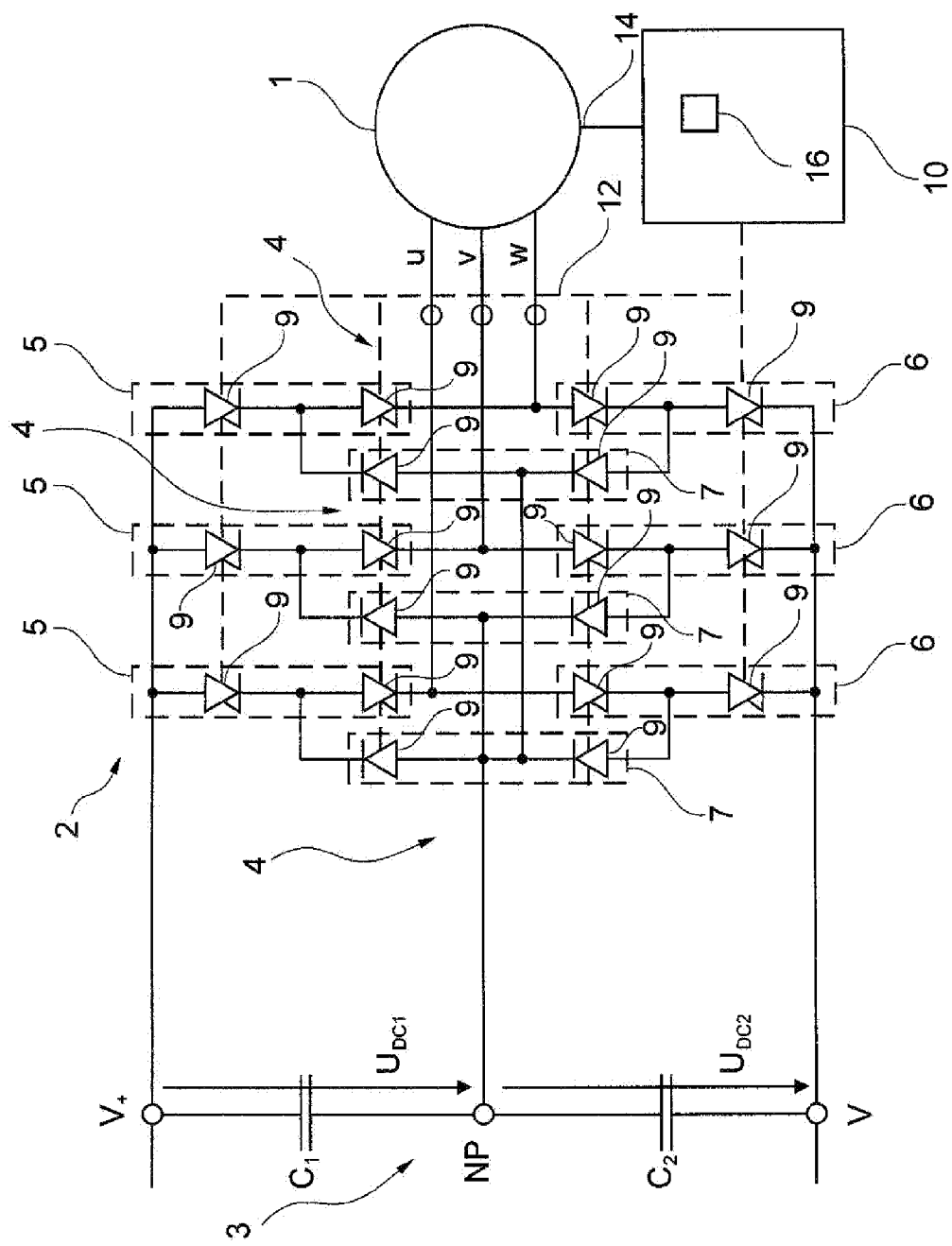
FIG. 1 shows a three-phase converter circuit for switching three voltage levels in accordance with an exemplary embodiment of the present disclosure.

A reduction in the switching losses can bring about a significant decrease in the operational costs of the drive. Furthermore, such a reduction in the switching losses can result in a more robust and reliable system and can extend the field of application of DTC since reduced switching losses make it possible to operate the same equipment at a higher power.

Exemplary embodiments of the present disclosure provide electrical drives with reduced operational costs and increased power.

An exemplary embodiment of the present disclosure provides a method for operating a rotating electrical machine.

In accordance with an exemplary embodiment of the present disclosure, the rotating electrical machine is supplied with electric current by a converter from a DC voltage circuit via at least one phase. The converter is configured to switch the at least one phase to at least two voltage levels.

The rotating electrical machine can be an electric motor or an electric drive, which can include the electric motor and the converter. The rotating electrical machine can include the converter and/or a controller. In general, a rotating electrical machine has three phases (three-phase current). However, it is also possible for only one phase or a plurality of phases to be provided.

In accordance with an exemplary embodiment of the present disclosure, the method can include the following steps: generating switching sequences, wherein each switching sequence comprises a series of switching transitions of the converter with a first switching transition; evaluating each of the switching sequences with a quality value; selecting the switching sequence with a minimum quality value; driving the switching elements of the converter with the first switching transition of the selected switching sequence as the selected switching transition, with the result that at least one phase is switched to a voltage level which corresponds to the switching transition.

In this case, a switching transition can be defined via switching states of the switching elements of the converter or via a combination of switching states of the individual switching states. For example, a switching transition includes a switching state combination of switching elements of the converter. The switching elements of the converter can be power semiconductors, such as thyristors, IGCTs and/or IGBTs, for example.

A switching sequence can be, for example, a vector $U=[u(k), u(k+1), \ldots, u(k+N-1)]$, wherein the switching transitions are defined by switching state combination u. u contains, for each switching element to be controlled, a switching state element which describes the switching state, e.g., 1, 0 or −1, for example. This can be the switch positions.

In accordance with an exemplary embodiment of the present disclosure, the switching sequences can be generated as follows: (a) a relatively long switching sequence is generated from a relatively short switching sequence, wherein at least one possible switching transition is attached to the relatively short switching sequence in order to generate the relatively long switching sequence; (b) output variables of the electrical machine, the converter and/or the drive are calculated for the relatively long switching sequence on the basis of the switching transitions in the relatively long switching sequence; (c) the relatively long switching sequence is rejected if calculated output variables (or at least one output variable) is not within predefined limits and/or calculated output variables move away from a predefined limit as time increases.

As used herein, the relatively long switching sequence may also be referred to as a switching sequence of a first length, and the relatively short switch sequence may also be referred to as a switching sequence of a second length. The second length is smaller than the fist length.

The short switching sequence has, for example, the length m and the relatively long switching sequence has, for example, the length n, where $n>=m+1$. If the switching sequence contains intermission elements, the relatively long switching sequence can be more than one step longer than the short switching sequence. However, the case where $n=m+1$ is also possible.

In accordance with an exemplary embodiment of the present disclosure, a first switching sequence or start switching sequence (with a length 0) is initialized with a preselected switching transition. In this case, the first switching sequence is the relatively long switching sequence for which steps (b) and (c) are implemented.

In accordance with an exemplary embodiment of the present disclosure, further switching sequences, which are, for example, longer than n, are generated for the unrejected relatively long switching sequence in accordance with steps (a) to (c).

In other words, a tree of switching transitions is generated iteratively, wherein each switching sequence can be given by the path from the root of the tree to a leaf of the tree. The output variables to be calculated can in this case be the torque or the flux of the rotating electrical machine or the mid-point potential(s) of the DC intermediate circuit in the converter or else the voltage(s) across capacitances or the current or currents through coils of the converter. The output variables can be time-dependent variables and are calculated for an interval which begins at the present point in time and reaches into the future for a certain time.

That is to say, in the case of a rotating electrical machine or a drive, switching losses can be minimized with an iterative control method, which calculates optimal switching states or switching sequences in advance.

In accordance with an exemplary embodiment of the present disclosure, the method can include: generating a (relatively long) permissible switching sequence from a relatively short permissible switching sequence by attaching switching transitions to the short switching sequence by means of a recursive or iterative algorithm. The algorithm can be initialized with a switching sequence with a length 0 from a preselected switching transition (or the switching transition which is presently applied at the converter). The permissibility of the relatively long switching sequence can be implemented by simulating or approximating at least one output variable, which needs to adhere to the abovementioned rules, for example.

This iterative optimum determination of the switching sequences can be performed per switching cycle of the converter.

The algorithm or the method can be processed sequentially, e.g., instead of first generating the switching sequences and then generating the associated trajectories of the output variables, the switching sequences are constructed stepwise by virtue of permissible switching transitions being branched or attached.

A stack can be used for this purpose, for example. A stack can in this case be a memory in which an object (in this case a switching sequence) can be placed on the stack by means of one function ("Push") and the uppermost object lying on the object stack can be retrieved by means of a further function ("Pop"). The algorithm can be implemented with a recursive function together with a stack.

In accordance with an exemplary embodiment of the present disclosure, the MPDTC method or the MPDTC algorithm can be based on a Last-In-First-Out stack model. The algorithm starts with the present time step k. Then, the algorithm investigates iteratively the tree of permissible switching sequences forwards in time. With each intermediate step, all of the switching sequences need to have trajectories of the output variables which are permissible. Permissible switching sequences can also be referred to as candidate sequences or candidate switching sequences. Permissible switching sequences can be switching sequences whose output variables are within their corresponding limits or point in the correct direction or come close to a limit. The two latter cases relate to the fact that an output variable is not necessarily within the permissible limits, but the degree to which the limits are breached decreases with each time step within the horizon.

A candidate switching sequence, e.g., an unrejected switching sequence, results in trajectories of output variables which satisfy the corresponding rules of step (c) at any time step. It is thus possible to ensure that the predetermined limits are maintained at any time during steady-state operation of the rotating electrical machine. As a result of this measure, the torque THD (Total Harmonic Distortion) of the rotating electrical machine can be reduced.

It is possible for a combination of the just mentioned conditions or rules to apply to the output variables. For example, a switching sequence can be permissible if the torque and the mid-point potential are within their predefined limits and the stator flux points in the correct direction.

The computation complexity of the MPDTC method is directly related to the number of permissible switching transitions which are predetermined by the converter topology (primarily by the number of voltage levels which the converter can generate) and the length of the switching horizon or the prediction horizon of the switching sequence. In this case, a prediction horizon can be defined as the length of a switching sequence, e.g., the number of time steps which is required for processing the switching sequence.

Long switching horizons increase the performance of MPDTC substantially by virtue of them reducing the switching losses and/or the total harmonic distortion (THD) of the current or the torque. However, they can also result in a considerable computation load since the number of possible switching sequences can explode combinatorially. Therefore, it has until now only been possible to implement and perform MPDTC on hardware if the algorithm has been restricted to very short switching horizons, such as those with a length of 1 or 2, for example. The present disclosure makes it possible to reduce the computation load for MPDTC with long switching horizons.

In accordance with an exemplary embodiment of the disclosure, the quality value is based on the switching losses of the converter to be expected or on the switching frequency of the converter to be expected in the case of the respective switching sequence. The general rule is that the lower the quality value, the lower the switching losses are.

According to an exemplary embodiment, a plurality of switching transitions generate a large number of switching operations of the switching elements of the converter, as a result of which the switching frequency of the switching elements increases. However, such a high switching frequency generates heat losses (as a result of the switching losses), in particular in power semiconductor switches as switching elements, as a result of which the power semiconductor switches can age, be damaged or even be destroyed more quickly. Overall, the switching losses of the converter can also be estimated indirectly via the switching frequency.

It is also possible for the quality function, e.g., the function with which the quality value of a switching sequence is calculated, to be a function of the time steps of the switching sequence (e.g., the length of the switching sequence) and the total number of switching transitions.

In accordance with an exemplary embodiment of the present disclosure, the quality function is a function of the sum of the switching losses which are produced by the individual switching transitions and the length of the switching horizon and/or the prediction horizon and/or the length of the switching sequence. The switching losses can be calculated on the basis of the stator currents of the rotating electrical machine and/or the converter, with these currents being a function of the stator and rotor fluxes. If the controller has an internal mathematical model for the rotating electrical machine and/or converter, these fluxes or the stator currents may be a main component of this model. In accordance with this embodiment, it may be possible to reduce the switching losses markedly (by up to 22%) in comparison with the simple quality function which is based on the switching frequency. These calculations can be performed "offline" and the results stored in a look-up table which can be used by the method during operation of the machine.

In accordance with an exemplary embodiment of the present disclosure, the switching sequences in the series of switching transitions can contain intermission elements. For example, an intermission element can define a switching intermission after a switching transition. The switching losses can be further reduced by intermissions between the switching transitions.

In accordance with an exemplary embodiment of the present disclosure, the switching intermission can be determined by the calculation of output variables. In this case, the calculation of output variables can be based on a mathematical model of the rotating electrical machine, the converter and/or the drive or on an approximation. In general, the output variables should fluctuate within their limits during the switching intermission or comply with the abovementioned rules.

A mathematical drive model of the converter and the rotating electrical machine can be used in order to calculate the number of steps in which the first trajectory of an output variable (for example torque, flux or mid-point potential) meets or comes close to one of the predefined limits. This can increase the accuracy of the predictions and therefore the control performance of the method (for example with respect to the switching losses and the torque).

In accordance with an exemplary embodiment of the present disclosure, the method can also include: generating a switching sequence comprising switching transitions and intermission elements based on a generalized switching horizon, which defines the order in which switching transitions and intermission elements are joined onto the switching sequence.

The intermission elements are intended to have the result that switching takes place as little as possible in order to keep the switching losses as low as possible. Therefore, switching intermissions with as long a length as possible are introduced. The length of the switching intermissions can be determined by the method and can be oriented on the fact that output variables of the drive adhere to the abovementioned, predefined rules.

A generalized switching horizon can be used to establish the switching sequences. The generalized switching horizon can include a plurality of switching elements (which define that a switching transition may be at the corresponding position in the switching sequence). The generalized switching horizon can comprise intermission elements between, in front of and after the switching elements. In order to describe this, a notation with "S" and "E" or "e" is used (the intermission elements can also be interpreted as extrapolation elements or expansion elements). One example of a generalized switching horizon is "SSESE". The switching losses can be reduced by up to 20% in comparison with a simple switching horizon with a length of two using a generalized switching horizon.

In addition, a generalized switching horizon can begin with an intermission element "e", which is at the start of the switching sequence for an optional wait intermission. This wait intermission can be determined similarly to the wait intermissions relating to the intermission element "E". As a result, the prediction horizon can be extended markedly, with the result that a more accurate prediction can be made. As a result, the switching losses are generally reduced.

The generalized switching horizon with its upper limit based on the number of the switching transitions and wait steps can be considered as one alternative to a fixed simple prediction horizon with a fixed number of time steps. The generalized switching horizon can result in a temporally variable length of the switching sequences and therefore in prediction horizons of different lengths.

In accordance with an exemplary embodiment of the present disclosure, during the calculation of output variables, the time at which a trajectory of an output variable meets an upper or lower predefined limit in the future is determined.

In accordance with an exemplary embodiment of the present disclosure, the determination of the time is performed analytically, using an optimization method for determining zeros, by approximation of trigonometric functions by Taylor series and/or by approximation of trigonometric functions by piecewise polynomial functions.

In accordance with an exemplary embodiment of the present disclosure, the stator flux resistance enters the calculation when determining the time.

In accordance with an exemplary embodiment of the present disclosure, the calculation of trajectories of output values is based on a mathematical model of the rotating machine or the drive and an interpolation. In contrast to the extrapolation, the interpolation has the advantage that the end points of the trajectory correspond better to reality than is the case with extrapolation.

In accordance with an exemplary embodiment of the present disclosure, the output variables can be interpolated in a time interval which includes a predetermined number of at least 10, for example, discrete time steps.

In accordance with an exemplary embodiment of the present disclosure, the output variables with the mathematical model can be calculated in the interval or at the boundaries thereof for at least three points in time.

In accordance with an exemplary embodiment of the present disclosure, the interpolation can be performed with a quadratic polynomial.

In accordance with an exemplary embodiment of the present disclosure, the method can also include: calculating a quality value for the (e.g., unrejected) switching sequence with a length n during the iteration.

In accordance with an exemplary embodiment of the present disclosure, the method can also include: calculating a lower limit for quality values on the basis of precalculated quality values of complete switching sequences.

In accordance with an exemplary embodiment of the present disclosure, the method can also include: rejecting switching sequences whose quality value exceeds the lower limit for quality values or whose quality value is greater than the lower limit for quality values.

In accordance with an exemplary embodiment of the present disclosure, the method can also include: calculating the quality value using an upper limit for a maximum expected length of a switching sequence or its prediction horizon.

In accordance with an exemplary embodiment of the present disclosure, first, e.g., at the start or prior to the recursion, the quality value of a promising switching sequence can be calculated. A promising switching sequence can, for example, be a switching sequence which has already been provided with a good quality value prior to the iteration method or for which a good quality value has already been calculated prior to the iteration method.

In accordance with an exemplary embodiment of the present disclosure, the promising switching sequence can be based on an optimal switching sequence of a preceding control cycle.

In accordance with an exemplary embodiment of the present disclosure, the promising switching sequence can be based on an optimal switching sequence, which has been calculated as a present switching horizon in a preceding optimization step with a relatively short switching horizon.

In accordance with an exemplary embodiment of the present disclosure, a two-stage method can be used for this purpose. First (in a first step), the optimization problem can be solved with a short switching horizon, e.g., "eSE", for example with the method or algorithm described above and below. Then, in a second step, a long switching horizon which is longer than the short switching horizon is used, e.g., "eSS-ESE". The method described above and below is in this case performed, for example, until the available computation time has elapsed. For the second step, the solution from the first step is used as the start value ("warm start" algorithm; see also further below).

The first problem can be solved relatively quickly and a comparatively good solution (switching sequence) can be calculated. This solution ensures that a switching state which is switchable, e.g., adheres to the switching restrictions of the converter, for example, and which ensures that the output variables do not move away from the defined limits (become unstable) and which produces an acceptable performance (relatively low switching losses etc.) is sent to the converter. It can be ensured that the small problem can be solved within the available computation time. In general, in the second step, a better solution is found which can be sent to the converter.

In accordance with an exemplary embodiment of the present disclosure, a switching sequence to be investigated with the highest level of priority can be determined. During the next iteration (e.g., during the next iteration step or in the same iteration step), the switching sequence with the highest level of priority is investigated.

In accordance with an exemplary embodiment of the present disclosure, switching sequences to be investigated are sorted in accordance with their prioritization.

In accordance with an exemplary embodiment of the present disclosure, the prioritization can be performed using at least one of the following rules: (i) switching sequences for which there is a greater probability that the switching sequences will result in a low quality value are prioritized; (ii) switching sequences for which there is a greater probability that the switching sequences will keep the output variables within predefined limits and/or the output variables will come close to the predefined limit as time increases are prioritized; (iii) switching sequences which have a switching transition for which there is a greater probability of the switching transition resulting in a permissible switching sequence or else in a switching sequence with a high quality are prioritized; (iv) switching sequences for which, on the basis of an estimation, it is expected that the switching sequences will lead to long switching intermissions without any switching transitions are prioritized; (incomplete) switching sequences are prioritized using their quality values; and switching sequences are prioritized using their length.

In accordance with an exemplary embodiment of the present disclosure, the method can also include: ending the generation of the switching sequences if all of the switching sequences up to a predetermined length have been generated. The predetermined length can, for example, be length of the switching horizon or a predetermined prediction horizon.

In accordance with an exemplary embodiment of the present disclosure, the method can also include: ending the generation of the switching sequences if an upper limit for the number of switching sequences generated has been reached or the available computation time has elapsed.

In accordance with an exemplary embodiment of the present disclosure, the method can also include: ending the generation of the switching sequences if a switching sequence has been determined whose quality value exceeds a lower limit for quality values by less than a defined percentage, for example, 5%. In other words, it is also possible for suboptimal MPDTC to be performed, in which not the optimal switching sequence, but a good switching sequence is determined. The motivation for performing suboptimal MPDTC results from the following:

Long switching horizons result in excellent performance. In a branch and bound search (which will be described in more detail further below), even with narrow limits, however, the optimal solution or the solution which is close to the optimum is found very quickly during a tree search. Nevertheless, a large proportion of the computation time is used for confirming that the optimum has actually been found.

It therefore arises that if the algorithm is stopped before such a confirmation or else certificate has been found (e.g., there is no untested node with a quality value which is less than the present minimum quality value), the optimum has probably already been found.

In accordance with an exemplary embodiment of the MPDTC method, only the first switching position or the first switching transition from the switching sequence is used on the drive or the converter thereof. Therefore, only the first element of the switching sequence needs to be optimal, but not necessarily the rest of the switching sequence.

Furthermore, a good candidate switching sequence with a short switching horizon can be found quickly. This short switching sequence can be used to begin a tree search in a tree with a long switching horizon by means of a "warm start" algorithm, described in more detail further below.

By way of summary, it may be better, instead of using short switching horizons and ensuring that the optimal solution is found in all circumstances, to use long (possibly generalized) switching horizons and to accept suboptimal solutions under certain circumstances which, however, under certain circumstances result in an MPDTC method which can have better performance.

An exemplary embodiment of the present disclosure also provides a controller for an electrical converter which is designed to implement the method as described above and below.

An exemplary embodiment of the present disclosure also provides a converter, for example with a controller which is designed to implement the method as described above and below.

For example, the converter is connected at its input to a DC voltage. At its output (a plurality of or three phases, three-phase current), the converter generates an AC voltage. Switching elements (for example thyristors, IGCTs or IGBTs) which are switched by the controller can be used for this purpose. In this case, the voltages can be from approximately 100V to 200 kV. That is to say that the converter may be a low-voltage, medium-voltage and high-voltage converter. The currents switched by the converter can be up to 10 000 A.

According to an exemplary embodiment, the MPDTC control algorithm or method can be used for any multi-point converter.

An exemplary embodiment of the present disclosure also provides a motor system which includes a rotating electrical machine and an electrical converter with a controller which is configured to supply current to the rotating electrical machine and to implement the method as described above and below.

An exemplary embodiment of the present disclosure also provides a non-transitory computer-readable medium having a computer program recorded thereon which causes a processor of a computer processing device (e.g., CPU) to implement the steps of the method as described above and below.

The computer program or the MPDTC control algorithm can be implemented on any desired computation hardware which comprises DSPs and FPGAs, for example.

In this case, a computer-readable medium may be a disk, a hard disk drive, a USB storage device, a RAM, a ROM, a CD, a DVD or an EPROM. It will be appreciated that the computer program can be distributed via a data communications network, such as the Internet, for example, which makes it possible to download a program code. As used herein, the term "computer-readable medium" means a non-transitory medium.

By way of summary, the following advantages can be provided by the described embodiments: the embodiments of the method make very long switching horizons possible which comprise a plurality of switching transitions which can be connected by intermission elements. First experiments show that, with a combination of embodiments of the method, the switching losses can be reduced by up to 60%, while the total harmonic distortion (THD) of the torque can at the same time be improved by approximately 20%. These experiments have been conducted on a so-called three-phase three-point medium-voltage converter, which drives an induction machine. In comparison with the simple MPDTC algorithm with a simple switching horizon of only two steps, the switching losses were reduced by up to 40%, while the torque THD was kept constant.

The exemplary embodiments are used to describe possible ways of avoiding the generation and investigation of switching sequences when said switching sequences are suboptimal. As a result, the average computation time can be markedly reduced. Furthermore, stop criteria can be given, with which it is possible to ensure that a good solution is found for a switching sequence. As a result, the maximum computation time is limited.

In general, the exemplary embodiments describe techniques for modifying and improving an MPDTC algorithm such that it becomes efficient, from a technical point of view, for converting in this way a method with long switching horizons to computation hardware now available. Simulation results show that the computation complexity in the worst case scenario can be reduced by one or two orders of magnitude, while the control performance (primarily with respect to switching losses and THD) remains substantially uninfluenced thereby.

The text which follows describes exemplary embodiments of the disclosure in detail with reference to the attached figures.

FIG. 1 shows a three-phase converter circuit 2 for a converter 2 for switching three voltage levels in accordance with an exemplary embodiment of the present disclosure. In the illustrated exemplary embodiment, a rotating electrical machine 1 is connected to a DC voltage circuit 3 of the converter circuit 2 via its phases u, v, w. In general, the rotating electrical machine 1 can be connected to a converter circuit 2 for switching m voltage levels, where m≥2. As shown in FIG. 1, the DC voltage circuit 3 is formed by a first capacitor $C_1$ and by a second capacitor $C_2$, which is connected in series with the first capacitor $C_1$. The DC voltage circuit 3 has a first main terminal $V_+$ at the first capacitor $C_1$, a second main terminal $V_-$ at the second capacitor $C_2$, and a sub-terminal NP (an intermediate-circuit center point) formed by the two capacitors $C_1$, $C_2$ connected in series. Furthermore, the converter circuit 2 includes a sub-converter system 4 which is provided for each phase u, v, w and is formed in each case by a first switching group or switching element 5, by a second switching group or switching element 6 and by a third switching group or switching element 7. Each switching group 5, 6, 7 is formed by two power semiconductor switches 9 connected in series, respectively. Furthermore, in each sub-converter system 4, the first switching group 5 is connected to the first main terminal $V_+$, and the second switching group 6 is connected to the second main terminal $V_-$. In addition, the first switching group 5 is connected in series with the second switching group 6, wherein the junction between the first switching group 5 and the second switching group 6 forms a phase terminal. The third switching group 7, which is in the form of a clamping switching group, is connected to the first switching group 5, e.g., to the junction between the two series-connected power semiconductor switches 9 in the first switching group 5. In addition, the third switching group 7 is connected to the second switching group 6, e.g., to the junction between the two series-connected power semiconductor switches in the second switching group 6. Furthermore, the third switching group 7, e.g., the junction between the two series-connected power semiconductor switches in the third switching group 7, is connected to the sub-terminal NP.

According to an exemplary embodiment, the power semiconductor switches 9 in the first and second switching groups 5, 6 can be in the form of drivable, bidirectional power semiconductor switches, wherein the power semiconductor switches in the third switching group 7 can be in the form of unidirectional, non-drivable power semiconductor switches 9. However, it is also conceivable for the power semiconductor switches in the third switching group 7 to also be in the form of drivable, bidirectional power semiconductor switches 9. The power semiconductor switches 9 can be thyristors, IGCTs or IGBTs, for example.

FIG. 1 shows a controller 10 of the converter 2 or the drive system (motor system) which includes the converter 2 and the electrical machine 1. The controller 10 can drive the power semiconductors 9 and therefore the switching groups or switching elements 5, 6, 7 via control lines 12 and switch the power semiconductor switches and switching groups or switching elements. Furthermore, it may be possible for the controller 10 to receive measurement signals from the electrical machine 1 via an optional measurement line 14. The controller 10 can then determine output variables of the rotating electrical machine 1 via these measurement signals. The algorithms and methods described herein can be executed by program modules of a processor 16 of the controller 10. For example, the processor 16 can be configured to execute a computer program containing instructions for carrying out the algorithms and various steps of the method. The computer program can be recorded on a computer-readable medium of the controller 10. As used herein, the term "computer-readable medium" constitutes a non-transitory medium on which programs and/or computer-readable instructions can be recorded.

In accordance with an exemplary embodiment of the method, the phases u, v, w of the converter circuit 2, which may generally be a converter circuit 2 for switching m voltage levels, are connected in each control cycle of the controller 10 to the DC voltage circuit 3 after a selected switching transition of switching states of the power semiconductor switches 9 of the converter circuit 2.

Figure 2A:
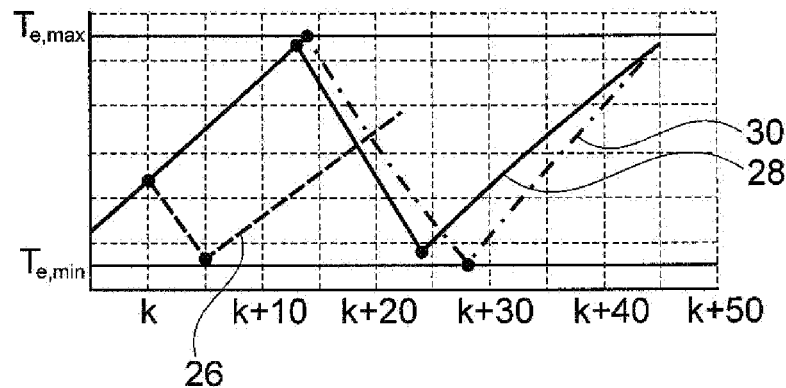
FIG. 2a shows torque trajectories in accordance with an exemplary embodiment of the present disclosure.
Figure 2B:
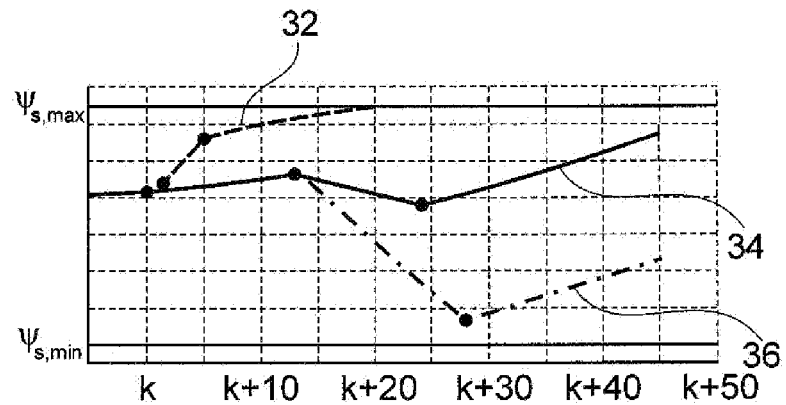
FIG. 2b shows stator flux trajectories in accordance with an exemplary embodiment of the present disclosure.
Figure 2C:
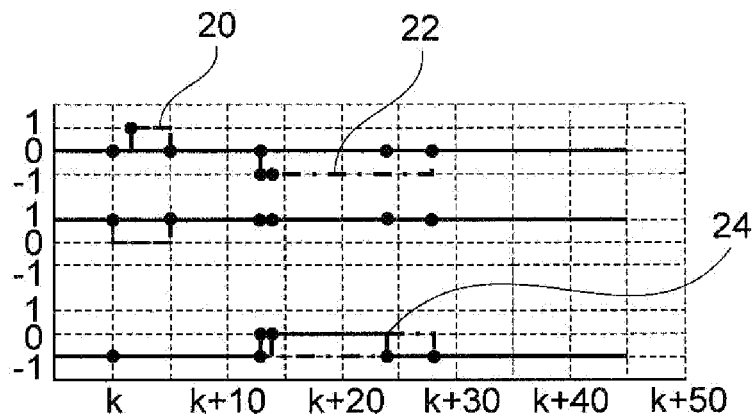
FIG. 2c shows switching sequences in accordance with an exemplary embodiment of the present disclosure.

FIG. 2c shows three candidate switching sequences 20, 22, 24. FIGS. 2a and 2b show the torque trajectories 26, 28, 30 and stator flux trajectories 32, 34, 36 which are associated with the candidate switching sequences, between the respective upper and lower limits of the trajectories. The time axis is indicated by sampling or discrete time steps in the three graphs, wherein the sampling interval, e.g., the time between k and k+1, for example, can be ts=25 µs. The present sampling time is in this case k.

FIG. 2c shows switching sequences 20, 24, 26 which have been generated with a switching horizon which has the elements "SSESE" and are no longer permissible for switching at the time steps k and k+1 and subsequent expansion of the trajectories of the output variables up to one or more of the trajectories. For example, this can take place at time step k+j (for example k+5 in the case of the switching sequence 20). The third switching event then takes place at this point in time and is followed by a further expansion step.

Figure 3:
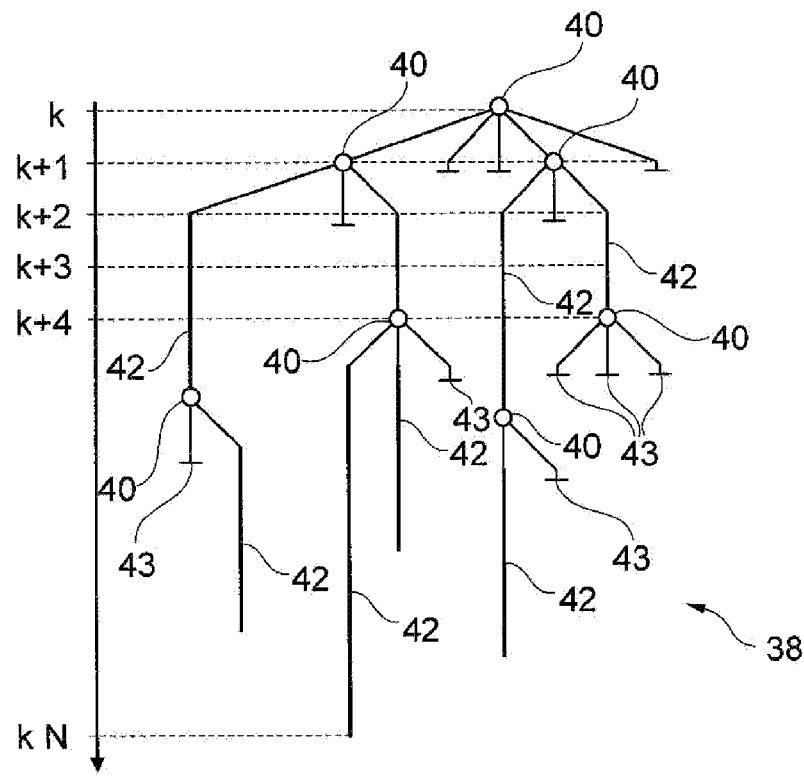
FIG. 3 shows a search tree in accordance with an exemplary embodiment of the present disclosure.

FIG. 3 shows an example of a search tree 38 which has been generated with the aid of an iterative MPDTC algorithm with the expanded switching horizon "SSESE". The search tree 38 has switching nodes 40 (corresponding to the switching elements of the horizon), at which branching to all permissible switching transitions is performed, and intermission nodes 42

(corresponding to the intermission elements of the horizon) which expand the trajectories of the output variables until a limit is reached.

The search tree 38 also has rejected nodes 43, which belong to switching sequences which have been rejected and which are denoted by an inverted T. The discrete time axis is shown on the left-hand side and extends from k to k+N, where N is the length of the horizon of the longest switching sequence.

Figure 4:
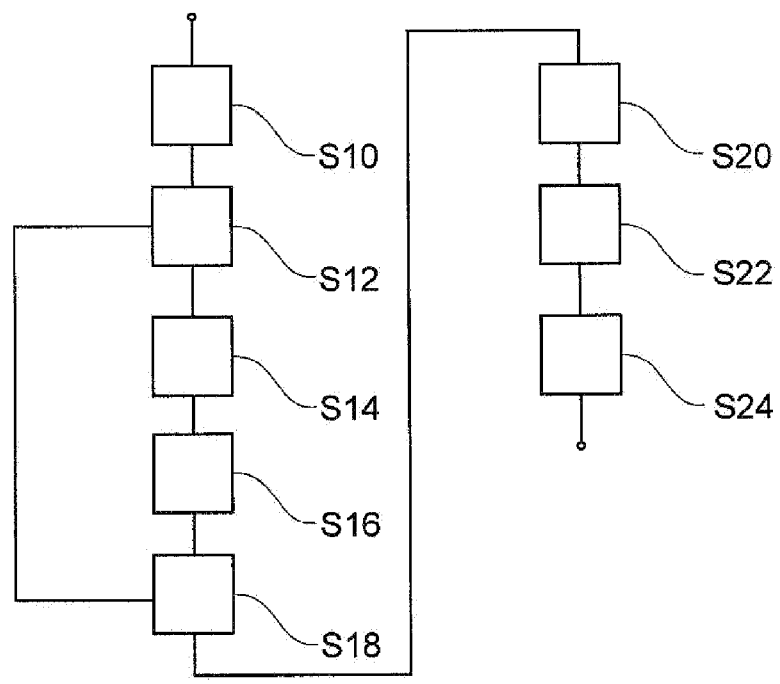
FIG. 4 shows a flow chart for an MPDTC method in accordance with an exemplary embodiment of the present disclosure.

FIG. 4 shows a flow chart for an iterative MPDTC algorithm which can have generated the search tree 38, for example. At time step k, the MPDTC algorithm calculates the switching sequence U=[u(k), u(k+1), . . . , u(k+N−1)] in accordance with the following procedure:

Initialize, in step S10, the root nodes of the tree with the present state vector of the drive x(k), the preceding switch position u(k−1) and the (generalized) switching horizon. Position the root nodes on a stack.

The state vector x(k) can contain, for example, the stator and rotor current components of the machine or the stator and rotor flux components of the machine or a combination thereof. Furthermore, the state vector x(k) can contain states of the converter such as the voltage potential at the intermediate-circuit center point(s), for example.

In step S12, take the uppermost node with a switching horizon which is not empty the stack.

In step S14, read the first element of the switching horizon. For "S", branch into all permissible switching transitions. In this case, permissible switching transitions are switching transitions which are permissible for the topology of the converter, e.g., which cannot damage the converter or subject the converter to too great a load. Permissible switching transitions can be stored in a look-up table and calculated "offline".

For "E", expand, in step S14, the trajectories of the output variables either by extrapolation, interpolation and/or using the internal drive model. In this case, the state vector x(k) can be used and can be updated with the calculated output variables.

In step S16, reject the switching sequences which are not candidates and only keep the switching sequences which are candidates. For example, switching sequences are not candidates if one or more output variables have left their limits after a switching transition.

In step S18, place the candidate switching sequences on the stack and go to step S12 if there are still nodes on the stack. If there are no longer any nodes on the stack which include switching horizons which are not empty, stop the calculation. The result of these calculations are the candidate switching sequences $U_i(k)=[u_i(k), \ldots, u_i(k+n_i-1)]$ with a variable length, where i is from 1 and 1 is an index set.

In step S20, calculate the associated quality value for each candidate switching sequence i in 1. If the switching frequency is intended to be minimized, take into consideration $c_i=s_i/n_i$, for example, which comes close to the average switching frequency, where $s_i = \Sigma_{j=k}^{k+ni-1} \|u_i(j)-u_i(j-1)\|_1$ is the total number of switching transitions in the switching sequence $U_i(k)$ and $n_i$ is the corresponding switching sequence length.

If, in step S20, the quality value is calculated by means of the switching losses, the quality function $c_i=E_i/n_i$ is used, where $E_i$ are the switching losses. In order to calculate the switching losses, it may be that the phase currents which are linear combinations of the flux components need to be calculated.

In step S22, select the optimal switching sequence $U^*=U_i(k)$ with the minimum quality value, where $i=\arg\min c_i$.

In step S24, apply the first switching transition u(k)=u* of the optimal switching sequence U* to the switching elements of the converter and implement the just described methods in the next time step k+1 (e.g., in the next control cycle).

The algorithm is constructed such that each candidate switching sequence produces output variable trajectories which are permissible. This attempts to ensure that the limits of the output variables are respected at any time during steady-state operation. Furthermore, the algorithm is implemented iteratively, e.g., instead of first listing the switching sequences and then calculating the associated output variable trajectories, the switching sequences are constructed stepwise by branching at the permissible switching transitions 40. One advantage of this is that the switching horizon can be expanded easily, with the result that a plurality of switching transitions 40 and a plurality of intermission nodes 42 can be taken into consideration. Furthermore, tree search techniques can be applied in order to reduce the computation load.

With reference to FIG. 3, the algorithm starts with the root node and runs through the search tree 38 with nodes 40, which in turn represent a root node for a subtree in which each node represents a permissible switching transition, and intermission nodes 42, which stand for expansion steps and only have one child node. The depth of the tree 38 is the number of available switching transitions plus the number of intermission steps per intermission node 42 within the switching horizon. The algorithm lists all permissible switching sequences which are candidate switching sequences and calculates their corresponding output variable trajectories and their quality values. Thus, all of the nodes in the search tree 40 which belong to candidate switching sequences are visited.

The just described algorithm can be modified in order to increase the computation efficiency, with the result that relatively long switching horizons can be calculated on hardware which is available nowadays. This can be achieved, for example, by the following techniques:

Quick and accurate methods for expanding the torque, stator flux and (intermediate-circuit) mid-point potential trajectories for a given switching state combination until one of the trajectories meets an associated hysteresis limit (or a general predefined limit). The aim here is to reduce the average computation time.

Customized optimization techniques in order to reduce the number of nodes visited in the search tree. The aim here is to reduce the average computation time.

Sub-optimal MPDTC, in which the maximum number of iteration steps (or the time) is limited but it is ensured that a permissible solution (switching transition) is found which may be suboptimal, however. This concept restricts the maximum computation time, which may be important primarily for implementing the algorithm.

Figure 5:
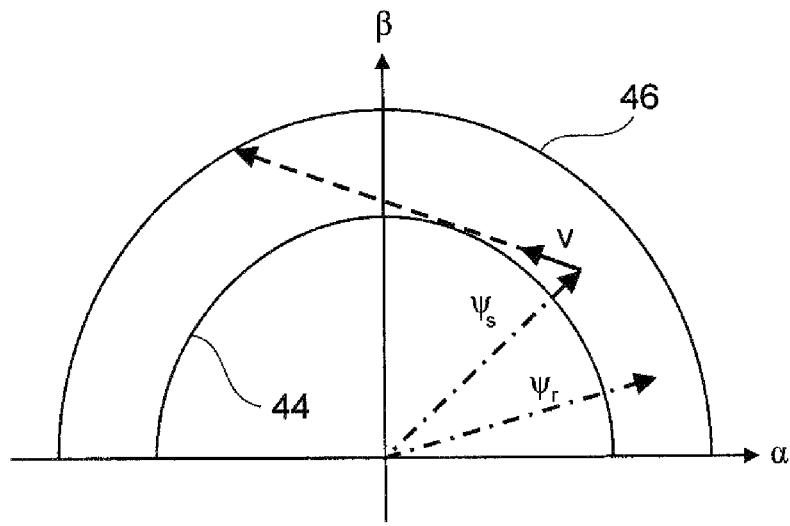
FIG. 5 shows one possibility, in accordance with an exemplary embodiment of the present disclosure, for calculating the trajectories of output variables.
Figure 6:
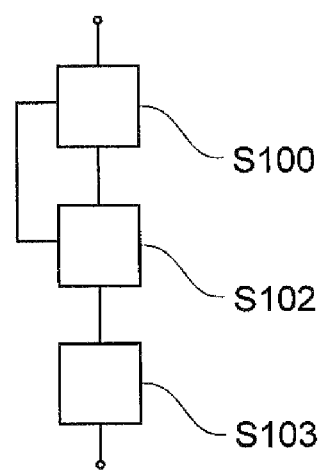
FIG. 6 shows a flow chart for calculating points of intersection of trajectories with limits in accordance with an exemplary embodiment of the present disclosure.

With reference to FIGS. 5 and 6, details will now be given regarding how, in step S14, the trajectories of output variables or the time when a trajectory intersects a limit can be determined by interpolation, extrapolation or other approximations.

Instead of possibly inaccurate extrapolations and simulations requiring a lot of computation time which use a model of the drive, the number of time steps for which a given switching state combination can be applied until one of the output variables (torque, stator flux and mid-point potential(s)) reaches a limit can be predicted analytically, wherein simple optimization methods for finding zeros can be used.

FIG. 5 shows a stator flux vector $\psi_s$ and a rotor flux vector $\psi_r$ in the α/β plane. The stator flux vector $\psi_s$ is moved by a voltage vector v, which is a function of the switching state combination u. The stator flux vector $\psi_s$ is in this case intended to remain within an inner hysteresis limit 44 and an outer hysteresis limit 46.

Without taking into consideration the stator resistance, a stator flux trajectory which starts at time 0 can be approximated by a simple relationship of the form $$\psi_s(t)=\psi_s(0)+tv,$$

wherein the stator flux vector $\psi_s$ is given in $\alpha/\beta$, v is the voltage vector in $\alpha/\beta$, t is the continuous time, and scale factors have been omitted.

Squaring this relationship and equating it with the inner hysteresis limit 44 (the radius of the inner circle) results in a second-order polynomial at time t. Depending on the position of the stator flux vector $\psi_s$ in relation to the hysteresis limits 44, 46 and the direction of the voltage vector v, this polynomial has no, one or two solutions which can be calculated easily. The same applies for an analogous relationship for the points of intersection with the outer hysteresis limit 46, which permits either no or two solutions.

The time t after which the stator flux $\psi_s$ intersects a hysteresis limit 44, 46 is given by the smallest non-negative time t, which is calculated as described above. This time can be used to determine the discrete time unit or the time step k which is closest to the time t.

Even the just disregarded stator flux resistance can be taken into consideration for the just described calculation in a variety of different ways:

By rotating the voltage vector v through a corresponding angle in the direction of the origin of the $\alpha/\beta$ plane.

By using the stator flux equation of the machine model. When beginning at time 0, especially the stator flux $\psi_s$ can be calculated after a short time interval for the given voltage vector v in $\alpha/\beta$ using the machine model (only the first two equations are required for this purpose). On the basis of this, the length and the orientation of the voltage vector v can be corrected in order to take account of the stator resistance.

These corrections can be calculated, for example "offline", for all of the voltage vectors v and for all of the torque and speed adjustments prior to implementing the algorithm. This information can be stored, for example, in a look-up table to which the algorithm can gain access.

The trajectory of the torque or the intersection thereof with its limits can also be determined in this way. The torque is the cross product between the stator flux $\psi_s$ and the rotor flux $\psi_r$. Assuming that the length of the rotor flux vector $\psi_s$ is constant within the prediction horizon, and that the rotation of the rotor flux vector $\psi_s$ takes place at a constant speed, the aforementioned stator flux development can be inserted into the torque equation. A simplification of the equation results in a torque development as a function of the flux components at time 0 and the terms $t \sin(w_r t)$ and $t \cos(w_r t)$, where $w_r$ is the rotation speed of the rotor flux $\psi_s$.

Equating the torque equation with the lower and the upper torque limit and determining the minimum non-negative time gives the time after which the first limit is touched or intersected. The torque equation can be solved in different ways. For example, the aforementioned calculations can be performed analytically.

Another possible way of solving the torque equation involves approximating the terms $t \sin(w_r t)$ and $t \cos(w_r t)$ by means of a Taylor series about the time t=0 or t>0. Furthermore, iteration can be performed via t, or t can be adjusted on the basis of already existing information regarding where the next contact with a limit is expected.

In addition, it is possible to approximate the terms $t \sin(w_r t)$ and $t \cos(w_r t)$ by a piecewise polynomial function and to solve the torque equation in each approximation interval.

Another possible way of solving the torque equation involving using an algorithm for determining zeros, for example Newton's method, the secant method and/or the regula falsi method. This algorithm can be broken off as soon as the time t has been determined at which the stator flux trajectory intersects one of its limits.

This algorithm will be described in relation to FIG. 6:

In step S100, find the next torque maximum or minimum for t>0 using an algorithm for determining zeros by equating the derivative with 0.

In step S102, decide whether the maximum or minimum is within the limits for the torque. If this is the case, continue with step S100. If this is not the case, continue with step S103.

In step S103, determine the limit which is being intersected, e.g., the upper or lower torque limit, and calculate the time at which the limit is touched using an algorithm for determining zeros.

The time at which the mid-point potential touches one of its limits can be calculated by means of any of the aforementioned ways. This includes extrapolation or an analytical solution similar to the solution described above for the torque equation.

In contrast to the just described method for analytically determining trajectories of output variables and the times when these trajectories intersect the upper or lower limit, the following text proposes a method which is based on the (possibly mathematical) drive model using a coarse sampling interval and quadratic interpolation. This approach is described with reference to FIGS. 7 and 8.

Figure 7:
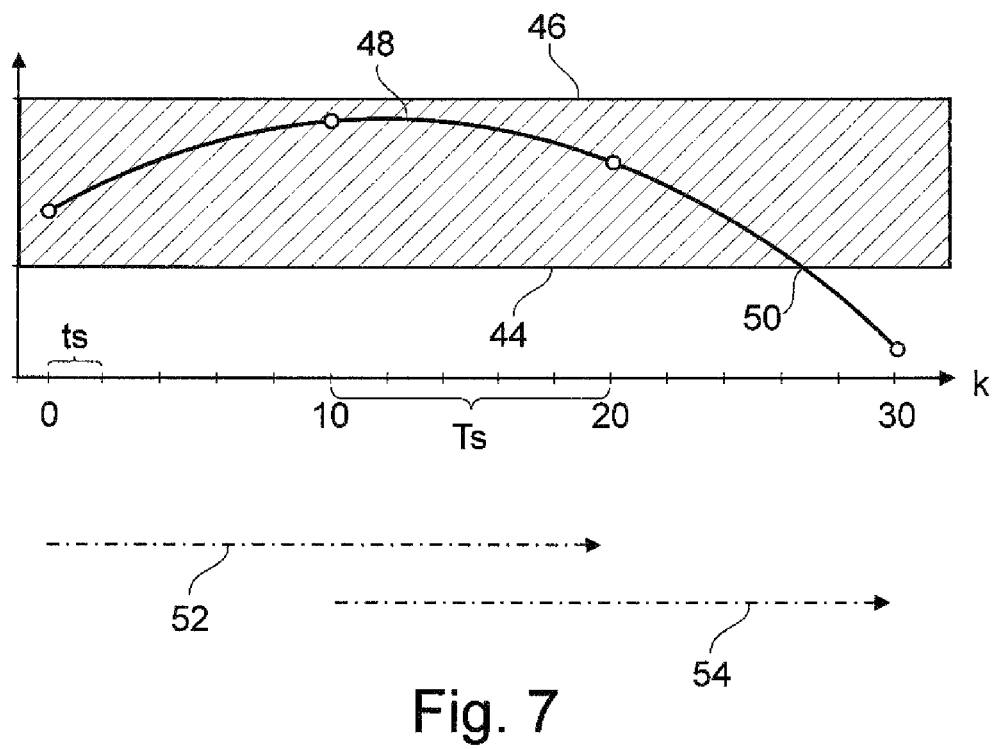
FIG. 7 shows a trajectory of an output variable in accordance with an exemplary embodiment of the present disclosure.

FIG. 7 shows a trajectory 48 of an output variable which has been plotted over the time axis k and has been calculated for the values at the coarse time steps Ts=d*ts. Here, is the sampling interval of the controller, e.g., the shortest time interval or the time step which the controller can sample, for example 25 µs or else the interval of a control cycle. A coarse sampling interval Ts=d*ts can be selected by virtue of d being set to 10, for example. A coarse sampling interval is therefore a multiple of the sampling interval of the controller 10.

As can be seen from FIG. 7, the trajectory 48 runs between k=0 and k=27 within the lower and upper hysteresis limits 44, 46 and intersects the lower hysteresis limit approximately at k=27.

Figure 8:
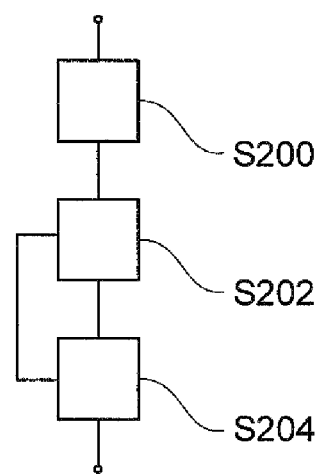
FIG. 8 shows a flow chart for determining a point of intersection of a trajectory with a limit in accordance with an exemplary embodiment of the present disclosure.

The algorithm described below with reference to FIG. 8 for determining a point of intersection 50 between the trajectory 48 and one of the limits 44, 46 is based on the fact that the time-discrete drive model stored in the controller 10 uses the coarse sampling interval Ts, and not the sampling interval of the controller 10, as the discretization step.

In step S200, start at k=0 and calculate or simulate the output variable at k=d and k=2d using the drive model.

In step S202, derive a quadratic approximation of the respective output variable trajectory 48 on the basis of the points at k=0, d and 2d for each output variable. On the basis of the curvature of the quadratic approximation and of whether the points at k=0, d and 2d are within, above or below the hysteresis limits 44, 46, identify which limit is a candidate for being intersected by the output variable trajectory.

In step S204, calculate the point of intersection of the quadratic approximation with the limit identified as the candidate. If there is a point of intersection, calculate the time of the intersection analytically. If the time is between k=0 and k=2d, stop the algorithm. Take the determined minimum time of all of the output variables for which the calculation has been performed as the time to be determined. If none of the output variables intersects a limit within k=0 and k=2d, move a coarse sampling interval Ts into the future and calculate the output variables at time step k=3d. Repeat step S202, but shifted through d.

Starting from the situation shown in FIG. 7, the algorithm will proceed as follows. In a first step, in which the interval 52 is considered on the basis of the points k=1, d and 2d, the point of intersection with the upper hysteresis limit is investigated, but no point of intersection is found. In a second step, if the interval 54 is considered on the basis of the points k=d, 2d and 3d, the point of intersection 50 with the lower hysteresis limit 44 is determined and the time k=27 is determined.

d can be selected such that the length of an interval (e.g., 2d) is in the region of the average number of expansion time steps, e.g., the average length of switching intermissions. This information can also be calculated "offline" by simulations and stored in a look-up table, for example.

Instead of determining the output variables at the time steps 0, d and 2d and using quadratic interpolation, the output variables can be calculated at times 0 and 2d, and the derivatives thereof can be calculated at time steps 0 and 2d. These calculated values can be used for quadratic interpolation.

In addition or as an alternative, linear or cubic interpolations on the basis of values of output variables can also be used given a suitable number of time steps. These time steps do not need to be distributed uniformly or spaced apart uniformly. In particular, a time step can be arranged where it is expected that the trajectory will intersect a limit.

Instead of determining and sorting (or prioritizing) all of the permissible switching sequences or candidate switching sequences, the number of switching sequences which are intended to be investigated can also be limited or reduced in order to reduce the average computation time.

Figure 9:
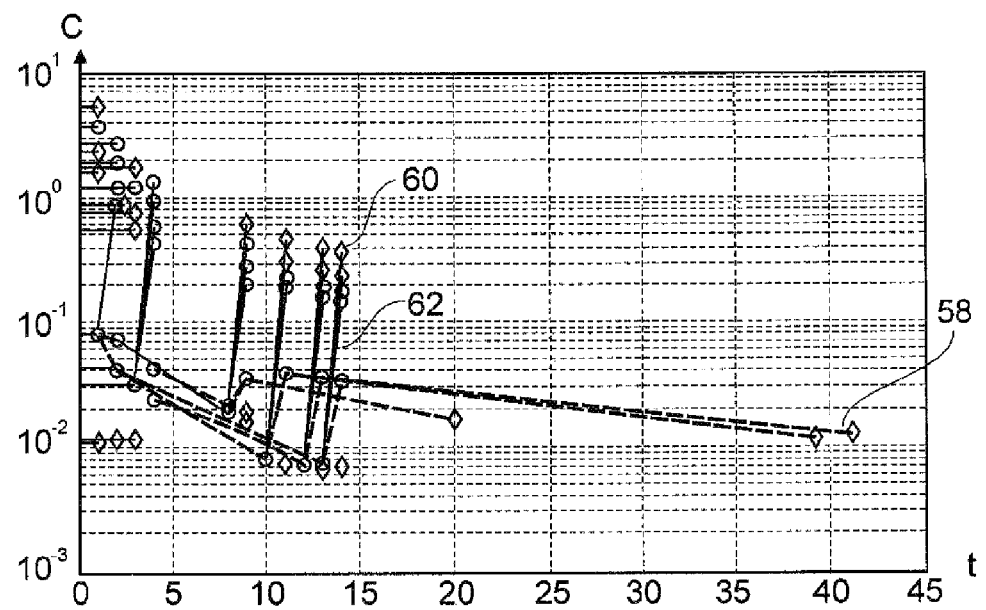
FIG. 9 shows a development of quality values in accordance with an exemplary embodiment of the present disclosure.

FIG. 9 shows the development of quality values over the variable length of the generalized switching horizon "eSS-ESE". In the graph in FIG. 9, the time is plotted in time steps towards the right and the quality is plotted towards the top. The development has arisen while implementing a so-called "branch and bound" search algorithm, which will be described in more detail later. The complete switching sequences 58 have been investigated completely, and the incomplete switching sequences 60 have not been investigated completely and have been abandoned. The switching sequences 62 have not yet been completely investigated. As is apparent from FIG. 9, the optimal switching sequence at that time in this case has a length of 39 time steps and a quality value of approximately 0.01.

It can be derived from FIG. 9 that the quality values do not rise monotonically if the switching sequences are expanded. Nevertheless, an estimation of the quality of incomplete switching sequences can be performed with the aid of the following calculations.

A complete switching sequence can, in this case, be a switching sequence which has all of the elements of the generalized switching horizon. In contrast to this, an incomplete switching sequence can be a switching sequence which is formed only by attaching elements to a complete switching sequence. That is to say that an incomplete switching sequence generally has fewer elements than a generalized switching horizon.

The quality value c of a complete switching sequence can in this case be calculated as follows: the quality value associated with a switching sequence is the sum of the switching losses of all of the switching transitions divided by the total length of the switching sequence n, e.g., $c=\text{sum}(E_{loss})/n$.

Since a switching horizon can contain switching transitions and intermission elements which can be of variable duration, n can have a variable length.

The minimum quality value c* at that time is the smallest quality value c which has been found within a run of the algorithm for a complete switching sequence.

The lower limit of the quality values $c_{lb}$ of the incomplete switching sequences can be calculated as follows: since the quality value c is typically the sum of the switching losses over all of the switching transitions in the switching sequence divided by the total length of the switching sequence, the quality values do not necessarily need to increase monotonically as the length of a switching sequence increases. In order to be able to use so-called branch and bound techniques, a lower limit for the quality values $c_{lb}$ is introduced, and this also applies to incomplete switching sequences: $c_{lb}$=sum $(E_{loss})/N_{max}$, where $N_{max}$ is an upper limit for the maximum length of the switching sequence. In this case, $c \geq c_{lb}$ holds true.

It is also possible for the maximum expected length of the switching sequences $N_{max}$ to be updated during the run of the algorithm. The search algorithm is more efficient if $N_{max}$ is a narrow upper limit of the maximum switching sequence length.

During the tree search, $N_{max}$ can be updated in many ways. Some approaches for this are mentioned below, and these can also be combined:

$N_{max}$ can be determined by offline simulations for each operating point and for each predetermined switching horizon, and stored in a look-up table.

$N_{max}$ can be transferred from the preceding control cycle to the next control cycle. During the tree search, $N_{max}$ can be increased if a switching sequence is found which has a longer switching horizon. It is also possible here for $N_{max}$ to be scaled from the preceding control cycle by a fixed value, for example by 0.9.

It is also possible for the start value of $N_{max}$ for a control cycle to be the maximum or the average of $N_{max}$ over a specific number of preceding control cycles.

Overall, it may be necessary for (incomplete) switching sequences which have previously been rejected during the tree search to be taken into consideration again if $N_{max}$ is increased and possibly for $c_{lb}$ to be updated.

Furthermore, relaxations and approximations can be used to calculate a lower limit $c_{lb}$.

Figure 10:
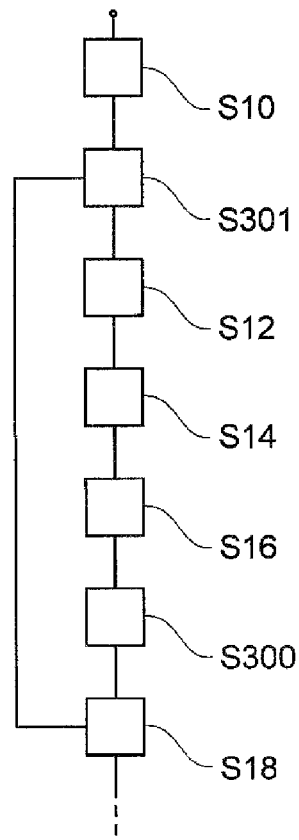
FIG. 10 shows detail of a flow chart for an MPDTC method in accordance with an exemplary embodiment of the present disclosure.

FIG. 10 illustrates detail of an algorithm which is similar to the algorithm shown in FIG. 4. However, step S20 from FIG. 4 has been replaced by step S300, and step S301 has been introduced. In addition, a branch from step S18 no longer leads to step S12 but to step S301. The order of the steps S300, S301, S12, S14 and S16 can, in this case, also be different than illustrated in FIG. 10. In step S300, switching sequences are rejected during the recursion or iteration. In step S301, unrejected switching sequences are sorted and/or prioritized. In step S12, a switching sequence with the highest level of priority is then selected. In principle, the quality function can be evaluated in step S300, and switching sequences can be rejected whenever c is greater than $c_{lb}$ for said switching sequences. It is also possible for the prioritization and sorting, e.g., regarding which switching sequence is intended to be taken into consideration, to be performed during the run prior to step S12.

The algorithm can be modified according to any one of the following techniques.

Customized "branch and bound" algorithm: calculate the switching sequences and the associated output variable trajectories (S14) and quality values (S300) iteratively if the tree is traversed from the root node to the leaves. In each iteration step (S300), calculate a lower limit $c_{lb}$ for the quality value of the present (possibly incomplete) switching sequence. If the lower limit $c_{lb}$ exceeds the minimum quality c* (the best complete switching sequence which has been determined until now), incomplete switching sequences are not taken into consideration and rejected.

"Depth-first search" algorithm: begin with the most promising switching sequence (for example, by always beginning with the incomplete switching sequence which has the same switching transitions as the most promising switching sequence being prioritized in step S301) and calculate the associated output variable trajectories and their quality value. The aim is to find a (complete) switching sequence which comes close to the optimal switching sequence and has a correspondingly small quality value immediately at the beginning of the tree search.

"Warm start" algorithm: the most promising switching sequences can be determined (at least partially) prior to the algorithm being run, for example from:
  the optimal switching sequence of the preceding control cycle which has been shifted through a time step,
  the optimal switching sequence which has been determined for a preceding optimization step which was implemented with a shorter switching horizon. (Since such a switching sequence is incomplete, this enables a partial "warm start" and a branch from the end of the incomplete switching sequence is required in order to obtain a complete switching sequence).
  It is also possible to determine the first switching position of a switching sequence by means of the method of geometrical analysis described further below.

Branch heuristics algorithms: in its basic form, the algorithm branches over all permissible switching transitions and in the process selects the uppermost node on the stack. In order to further reduce the number of iterations, the most promising switching transitions (nodes) are first investigated, and the switching transitions therefor are sorted correspondingly. Sorting or prioritization in step S301 can be performed by introducing branch heuristics, which include, for example:

The prioritization is performed using the probability with which a switching sequence leads to a permissible and/or good switching sequence. The probability can be determined for the switching transition to be investigated from a look-up table which has previously been calculated "offline", or this can be determined "online": for each operating point and each (voltage vector) sector in the α/β plane, the probability of each switching transition (voltage vector) is determined by simulation of the steady-state operation. In order to reduce the storage requirement, the problem is transferred to the zero sector and the probability distribution is determined for the zero sector. The switching positions or switching sequences are then sorted according to decreasing probability and branching is performed first for the switching sequences or switching positions which have the greatest probability. An example of the width of a sector can be 15, 30, 45 or 60°. In other words, the problem is mapped in a low-dimensional space using symmetry properties of the 3-phase system. For this space, the probability with which each individual switching state or switching transition is used can be calculated "offline" by simulations.

As an alternative or in addition to this, the switching transitions and switching sequences can also be sorted based on a geometrical analysis. Switching positions which maintain a constant torque lie on a line parallel to the rotor flux, while the switching positions which keep the magnitude of the stator flux constant lie on a line perpendicular to the stator flux. On the basis of these considerations, discrete switching positions can be determined which increase or decrease the torque and/or increase or decrease the stator flux. Irrespective of whether the torque is close to the upper or lower limit and therefore needs to be reduced or increased, discrete switching positions which fulfill these criteria can be selected and prioritized. The same calculation can also be performed for the stator flux and the mid-point potentials or the mid-point potential. The concept here is that of calculating an ideal voltage which would generate a constant torque and a constant flux. This ideal voltage can only be reached by infinitely rapid switching, e.g., only at the limit value. The ideal voltage can be transferred to ideal switching states which are generally not integral, and therefore not switchable, but are real, such as [0.9; −0.8; 0.1], for example. However, switchable is only [1; −1; 0], for example. The ideal voltage or the ideal switching state or switching transition can be a good start value in the vicinity of which, for example, [1; −1; 0] promising switching states or switching transitions are located. Furthermore, switching states or switching transitions which have a desired effect on the converter and the machine, e.g., increase the torque, for example, can be determined on the basis of the ideal voltage.

What has just been stated can be performed for so-called relaxed switching positions or switching transitions, e.g., real switching states. Once the desired relaxing switching positions have been determined, the discrete switching positions in the vicinity of the relaxed switching positions can also first be considered.

In order to sort and/or prioritize switching sequences (S301), a procedure can also be followed in which the node with the best quality value up to the present point in time within the control cycle is investigated next (either c or $c_{lb}$).

Figure 11:
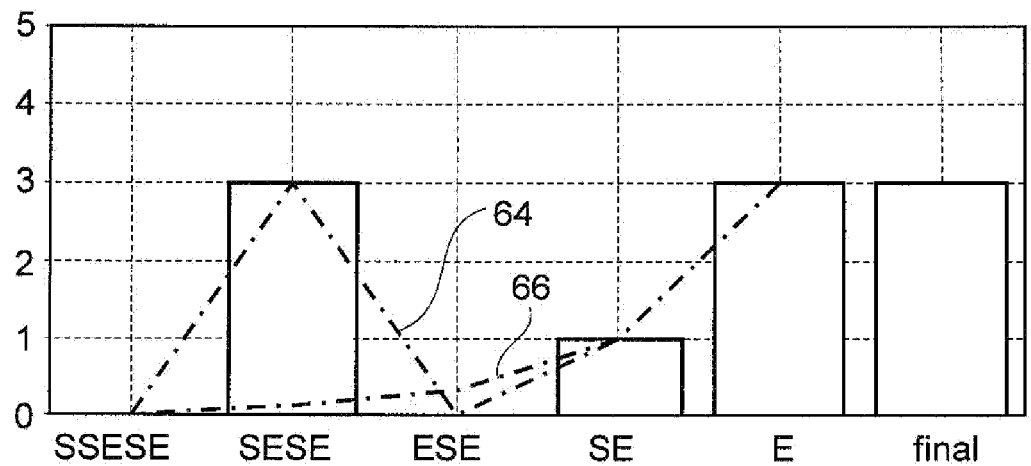
FIG. 11 shows a histogram with the number of nodes per level of a search tree in accordance with an exemplary embodiment of the present disclosure.
Figure 12:
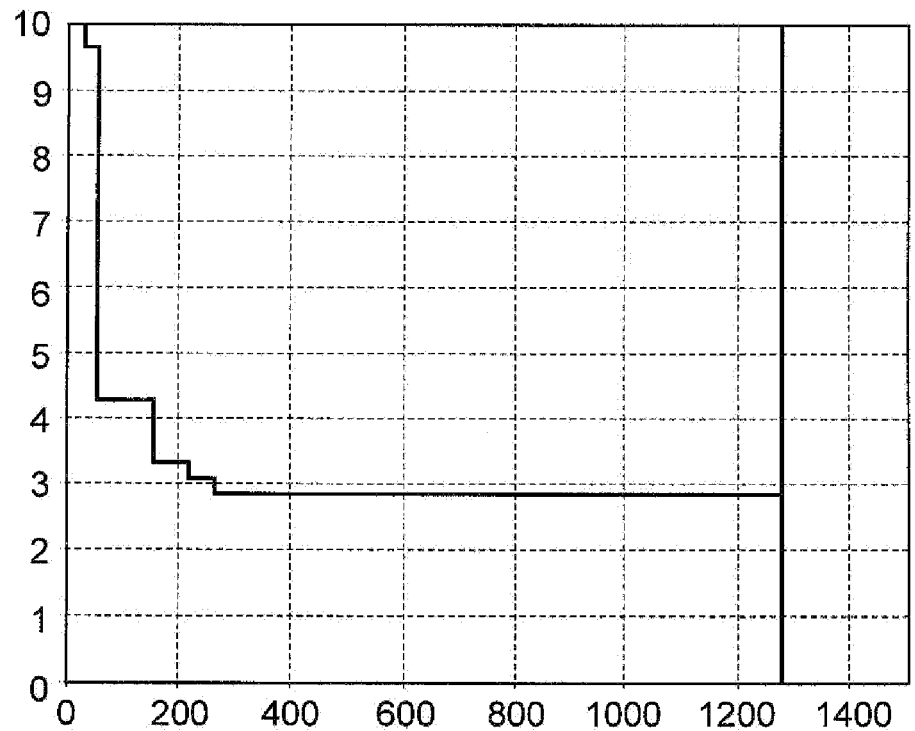
FIG. 12 shows the profile of the present quality during a quality calculation in accordance with an exemplary embodiment of the present disclosure.

A further possibility for prioritizing switching sequences in step S301 is described in relation to FIGS. 11 and 12.

FIG. 11 shows a histogram with a number of nodes per level of the search tree for the generalized switching horizon "eSSESE". In the histogram, the number of nodes is illustrated towards the top and the depth of the search tree or the levels are illustrated towards the right. As can be seen from the graph, the depth of the search tree can also be denoted by the remaining actions to be performed from the generalized switching horizon (for example "ESE").

The prioritization of the nodes in the search tree and the switching sequences can take place in such a way that the histogram is formed a specific way. This makes it possible to adapt the distribution of nodes which have not been investigated or incomplete switching sequences in the search tree. Instead of always selecting the node with the smallest quality value (which is usually at an upper level, e.g., on the left-hand side in the histogram, of the search tree), it may be advantageous to calculate quickly complete switching sequences in order to quickly obtain lower optimal quality values (good limits) and therefore also to direct the focus to the lower levels of the search tree.

With reference to FIG. 11, the line 66 in this case represents the desired histogram, and the line 64 represents the present histogram which has been produced by the algorithm having been partially implemented. In this example, a node of the second level (at which the actions "SESE" still need to be implemented) is selected. In particular, in this case the node in the second level with the smallest quality value can be taken.

This can be achieved by the following modifications to the algorithm shown in FIG. 10:

In step S301, determine, in addition, the number of nodes for each level of the search tree. This leads to the histogram in FIG. 11, for example. Decide upon the desired form of the histogram, for example an exponential function of the depth of the search tree. This form can also be already predefined.

In step S301, select the level which violates the desired histogram form the most. For this level, select the (incomplete) switching sequence with the lowest quality value, for example, and prioritize this.

A large proportion of the embodiments described above contribute to a reduction in the average computation time. However, it may be equally important to limit the maximum computation time.

This can be achieved due to the maximum number of computation steps or the computation time being limited, and the suboptimal solutions to the MPDTC problem being permitted, but it is possible to ensure that a good (candidate) switching sequence is always found.

As described above, a candidate switching sequence results in trajectories of output variables which are permissible, e.g. e, are within certain limits or point in the right direction.

FIG. 12 shows the development of quality values (in this case on the basis of the switching losses) illustrated via the number of iterations during a tree search. In the graph, the number of iterations is plotted towards the right and the switching losses in kilowatts are plotted towards the top.

It is apparent from the graph that the optimal quality value is found quickly, in this case after approximately 25% of the total number of iterations. Most iterations (in this case 75%) are only used for confirming the optimality of the solution. The optimal first element of the switching sequence, e.g., the next optimal switching transition, is found even earlier (within less than 25% of the total number of iterations).

It can therefore be expedient to implement a suboptimal MPDTC method. In order to implement a suboptimal MPDTC algorithm or method, the following modifications can be made to the previously described MPDTC algorithms.

In step S18 from FIGS. 4 and 10, an alternative or additional exit condition for ending the recursion can be used:

An upper limit for the number of switching sequences or nodes which are investigated and/or an upper limit for the computation time made available is introduced. The algorithm is stopped if this number or this time is exceeded. The optimal switching sequence determined up to exit is used as the (suboptimal) solution.

As an alternative to this, the optimization algorithm can be run until an interrupt takes place which stops the tree search. An interrupt can interrupt the tree search at any time. This makes it possible to avoid processor idle time and instead to use this time with the improvement of the optimal solution at that time.

It is also possible to stop the algorithm if a guarantee for the proximity to optimality is reached. In this case, an acceptable optimality margin is given which may be, for example, 2% in relation to the quality function. The tree search is stopped when a complete switching sequence has been determined which is within 2% of the best $c_{lb}$, where $c_{lb}$ represents the lower barrier for the quality of incomplete switching sequences.

Furthermore, it is additionally possible to ensure that a good switching sequence which is permissible, whose first switching state or switching transition is permissible, which ensures stable response of the drive (e.g., the output variable trajectories thereof fluctuate within the limits or approach these limits) and/or which ensures a good performance of the machine and the converter (the predicted quality is small), is always found. This can be achieved in a variety of ways:

A "warm start" algorithm combined with a "depth-first" search algorithm, as is described above, for example, fulfils the preconditions of finding a solution (switching sequence) over the entire switching horizon which is close to the optimal switching sequence quickly.

It is also possible to implement the algorithm with two switching horizons of different lengths during a control cycle. In a preliminary stage, the switching algorithm with a short switching horizon is implemented and an optimal or suboptimal switching sequence for this short switching horizon is calculated. This switching sequence can then be used to perform the main stage of the optimization method by means of the "warm start" algorithm, for example.

Furthermore, as has already been described, the search area can be reduced by removing unpromising switching transitions (nodes) from the search tree. This can be performed, for example, on the basis of a geometrical analysis, as described above.

It should be understood that the various exemplary embodiments of methods and algorithms described above can be combined with one another, even if this is not explicitly mentioned.

The methods and algorithms can be implemented as programmed software modules in which a processor executes a computer-readable program recorded on a non-transitory computer-readable medium to carry out the operative features of the above-described exemplary embodiments. However, the possibility of the methods and algorithms being mapped at least partially by means of hardware is also possible.

It should also be mentioned that "comprising" does not rule out any other elements or steps and "one" or "a" does not rule out a greater number. In addition, it should be noted that features or steps which have been described with reference to one of the above exemplary embodiments can also be used in combination with other features or steps from other above-described exemplary embodiments. The reference symbols in the claims should not be considered as any form of restriction.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 rotating electrical machine
2 converter circuit for switching three voltage levels
3 DC voltage circuit
4 sub-converter system
5, 6, 7 first, second and third switching group, switching element
9 power semiconductor
10 controller
12 control line
14 measurement signal line
16 processor
20, 22, 24 candidate switching sequences
26, 28, 30 torque trajectories
32, 34, 36 stator flux trajectories
38 search tree
40 switching node
42 intermission node
43 rejected node
$\psi_s$ stator flux vector ψ_r rotor flux vector
v voltage vector
44 inner/lower hysteresis limit
46 outer/upper hysteresis limit
48 trajectory
ts smallest sampling interval
Ts coarse sampling interval
50 point of intersection
52, 54 interval
58, 60, 62 quality values of switching sequences
64, 66 number of nodes to be investigated or investigated

What is claimed is:

1. A method for operating a rotating electrical machine, wherein the rotating electrical machine is supplied with electric current by a converter from a DC voltage circuit via at least one phase, and the converter is configured to switch the at least one phase to at least two voltage levels, wherein the method comprises:
generating switching sequences, wherein each switching sequence comprises a series of switching transitions of the converter with a first switching transition;
evaluating each of the switching sequences with a quality value;
selecting the switching sequence with a minimum quality value;
driving switching elements of the converter with the first switching transition of the selected switching sequence as the selected switching transition, so that at least one phase is switched to a voltage level which corresponds to the selected switching transition;
wherein the switching sequences are generated as follows:
(a) a switching sequence of a first length is generated from a switching sequence of a second length smaller than the first length, wherein at least one possible switching transition is attached to the switching sequence of the second length, and a first switching sequence with a preselected switching transition is initialized;
(b) output variables of the electrical machine are calculated for the switching sequence of the first length on the basis of the switching transitions of the switching sequence of the first length;
(c) the switching sequence of the first length is rejected if calculated output variables are not within predefined limits and/or calculated output variables become removed from a predefined limit as the time increases; and
further switching sequences are generated iteratively from the unrejected switching sequence in accordance with steps (a) to (c), and
wherein the method comprises:
calculating a lower limit for quality values based on previously calculated quality values of complete switching sequences; and
rejecting switching sequences whose quality value exceeds the lower limit for quality values.

2. The method as claimed in claim 1, wherein the quality value is based on the switching losses of the converter to be expected or on the switching frequency of the converter to be expected in the case of the respective switching sequence.

3. The method as claimed in claim 2, wherein:
the switching sequences contain intermission elements in the series of switching transitions;
an intermission element defines a switching intermission after a switching transition;
the switching intermission is determined by the calculation of output variables; and
the calculation of output variables is based on a mathematical model of the rotating electrical machine or on an approximation deriving a variable trajectory of the output variables within a predetermined time period and outer and lower hysteresis values for the switching sequences.

4. The method as claimed in claim 3, further comprising:
generating a switching sequence comprising switching transitions and intermission elements based on a generalized switching horizon, which defines an order in which switching transitions and intermission elements are joined onto the switching sequence.

5. The method as claimed in claim 4, wherein, during the calculation of output variables, the time at which a trajectory of an output variable meets an upper or lower predefined limit in the future is determined.

6. The method as claimed in claim 5, wherein the determination of the time is performed analytically, using an optimization method for determining zeros, by approximation of trigonometric functions by Taylor series and/or by approximation of trigonometric functions by piecewise polynomial functions.

7. The method as claimed in claim 6, wherein the determining of the time comprises incorporating a stator flux resistance in the calculation.

8. A non-transitory computer-readable medium having a computer program stored thereon which causes a processor of a computing device to carry of the method as claimed in claim 7.

9. The method as claimed in claim 1, wherein:
the switching sequences contain intermission elements in the series of switching transitions;
an intermission element defines a switching intermission after a switching transition;
the switching intermission is determined by the calculation of output variables; and
the calculation of output variables is based on a mathematical model of the rotating electrical machine or on an approximation deriving a variable trajectory of the output variables within a predetermined time period and outer and lower hysteresis values for the switching sequences.

10. The method as claimed in claim 9, further comprising:
generating a switching sequence comprising switching transitions and intermission elements based on a generalized switching horizon, which defines an order in which switching transitions and intermission elements are joined onto the switching sequence.

11. The method as claimed in claim 1, wherein, during the calculation of output variables, the time at which a trajectory of an output variable meets an upper or lower predefined limit in the future is determined.

12. The method as claimed in claim 11, wherein the determination of the time is performed analytically, using an optimization method for determining zeros, by approximation of trigonometric functions by Taylor series and/or by approximation of trigonometric functions by piecewise polynomial functions.

13. The method as claimed in claim 11, wherein the determining of the time comprises incorporating a stator flux resistance in the calculation.

14. The method as claimed in claim 1, comprising:
calculating trajectories of output variables based on a mathematical model of the rotating machine and on an interpolation, wherein the output variables are interpolated in a time interval which includes a predetermined number of discrete time steps, and wherein in the interval, the output variables are calculated with the mathematical model for at least three points in time.

15. The method as claimed in claim 1, further comprising:

calculating a quality value for the switching sequence of the first length during the iteration.

16. The method as claimed in claim 1, further comprising:

calculating the quality value using an upper limit for a maximum expected length of a switching sequence.

17. The method as claimed in claim 1, wherein the quality value of a promising switching sequence is first calculated;

wherein the promising switching sequence is based on at least one of the following:

an optimal switching sequence of a preceding control cycle, and an optimal switching sequence which has been calculated in a preceding optimization step with a relatively short switching horizon as a present switching horizon.

18. The method as claimed in claim 1, wherein a switching sequence to be investigated with the highest level of priority is determined, and wherein, during the next iteration, the switching sequence with the highest level of priority is investigated.

19. The method as claimed in claim 18, wherein the prioritization is performed using at least one of the following rules:

switching sequences for which there is a greater probability that the switching sequences will result in a low quality value are prioritized;

switching sequences for which there is a greater probability that the switching sequences will keep the output variables within predefined limits and/or the output variables will come close to the predefined limit as time increases are prioritized;

switching sequences for which, on the basis of an estimation, there is an expectation that the switching sequences will lead to long switching intermissions without any switching transitions are prioritized;

switching sequences are prioritized using their quality values; and switching sequences are prioritized using their length.

20. The method as claimed in claim 1, further comprising:

ending the generation of the switching sequences if all of the switching sequences up to a predetermined length have been generated.

21. The method as claimed in claim 1, further comprising:

ending the generation of the switching sequences if an upper limit for the number of switching sequences generated has been reached or the available computation time has elapsed.

22. The method as claimed in claim 1, further comprising:

ending the generation of the switching sequences if a switching sequence has been determined whose quality value exceeds a lower limit for quality values based on previously calculated quality values of complete switching sequences by less than a defined percentage.

23. A controller for an electrical converter, the controller being configured to implement the method as claimed in claim 1.

24. A motor system comprising:

an electrical converter including a controller configured to implement the method as claimed in claim 1, the electrical converter being configured to supply current to the rotating electrical machine.

25. A non-transitory computer-readable medium having a computer program stored thereon which causes a processor of a computing device to carry of the method as claimed in claim 1.

26. A method for operating a rotating electrical machine, wherein the rotating electrical machine is supplied with electric current by a converter from a DC voltage circuit via at least one phase, and the converter is configured to switch the at least one phase to at least two voltage levels, wherein the method comprises:

generating switching sequences, wherein each switching sequence comprises a series of switching transitions of the converter with a first switching transition;

evaluating each of the switching sequences with a quality value;

selecting the switching sequence with a minimum quality value;

driving switching elements of the converter with the first switching transition of the selected switching sequence as the selected switching transition, so that at least one phase is switched to a voltage level which corresponds to the selected switching transition;

wherein the switching sequences are generated as follows:

(a) a switching sequence of a first length is generated from a switching sequence of a second length smaller than the first length, wherein at least one possible switching transition is attached to the switching sequence of the second length, and a first switching sequence with a preselected switching transition is initialized;

(b) output variables of the electrical machine are calculated for the switching sequence of the first length on the basis of the switching transitions of the switching sequence of the first length;

(c) the switching sequence of the first length is rejected if calculated output variables are not within predefined limits and/or calculated output variables become removed from a predefined limit as the time increases; and further switching sequences are generated iteratively from the unrejected switching sequence in accordance with steps (a) to (c), wherein a switching sequence to be investigated with the highest level of priority is determined, and wherein, during the next iteration, the switching sequence with the highest level of priority is investigated.

27. The method as claimed in claim 26, wherein the prioritization is performed using at least one of the following rules:

switching sequences for which there is a greater probability that the switching sequences will result in a low quality value are prioritized;

switching sequences for which there is a greater probability that the switching sequences will keep the output variables within predefined limits and/or the output variables will come close to the predefined limit as time increases are prioritized;

switching sequences for which, on the basis of an estimation, there is an expectation that the switching sequences will lead to long switching intermissions without any switching transitions are prioritized;

switching sequences are prioritized using their quality values; and switching sequences are prioritized using their length.

28. A method for operating a rotating electrical machine,
wherein the rotating electrical machine is supplied with electric current by a converter from a DC voltage circuit via at least one phase, and the converter is configured to switch the at least one phase to at least two voltage levels, wherein the method comprises:
generating switching sequences, wherein each switching sequence comprises a series of switching transitions of the converter with a first switching transition;
evaluating each of the switching sequences with a quality value;
selecting the switching sequence with a minimum quality value;
driving switching elements of the converter with the first switching transition of the selected switching sequence as the selected switching transition, so that at least one phase is switched to a voltage level which corresponds to the selected switching transition;
wherein the switching sequences are generated as follows:
(a) a switching sequence of a first length is generated from a switching sequence of a second length smaller than the first length, wherein at least one possible switching transition is attached to the switching sequence of the second length, and a first switching sequence with a preselected switching transition is initialized;
(b) output variables of the electrical machine are calculated for the switching sequence of the first length on the basis of the switching transitions of the switching sequence of the first length;
(c) the switching sequence of the first length is rejected if calculated output variables are not within predefined limits and/or calculated output variables become removed from a predefined limit as the time increases;
further switching sequences are generated iteratively from the unrejected switching sequence in accordance with steps (a) to (c); and
ending the generation of the switching sequences if a switching sequence has been determined whose quality value exceeds a lower limit for quality values based on previously calculated quality values of complete switching sequences by less than a defined percentage.

* * * * *